UNITED STATES PATENT OFFICE.

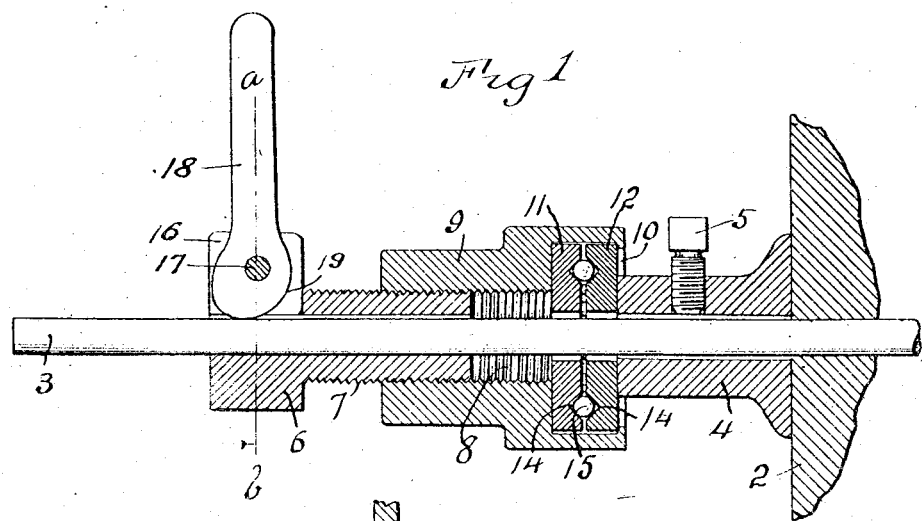
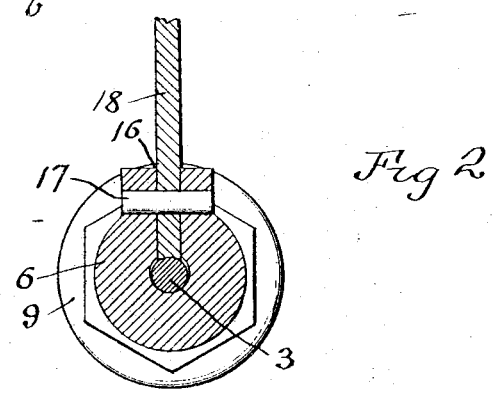
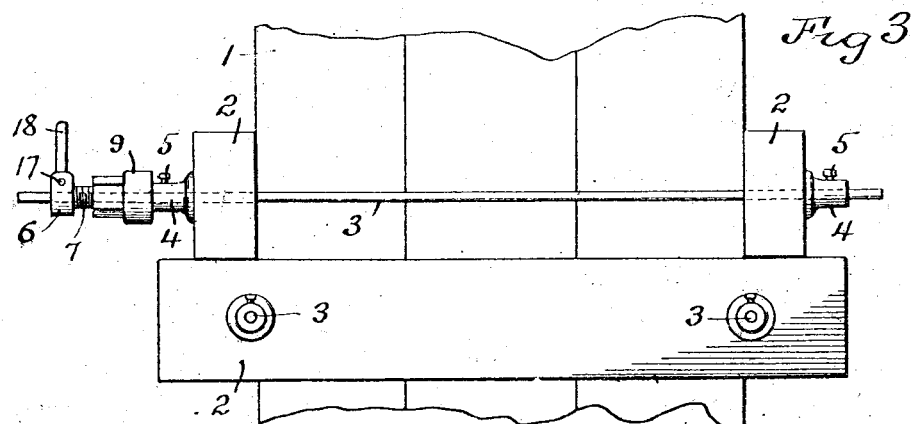

HENRY H. LAMPERT, OF KANSAS CITY, MISSOURI, ASSIGNOR OF ONE-HALF TO ARTHUR L. RICHTMYRE, OF KANSAS CITY, MISSOURI.

MOLD-CLAMPING DEVICE.

1,109,295.  Specification of Letters Patent.  Patented Sept. 1, 1914.

Application filed November 29, 1912. Serial No. 733,938.

*To all whom it may concern:*

Be it known that I, HENRY H. LAMPERT, a citizen of the United States, residing at Kansas City, in the county of Jackson and State of Missouri, have invented a certain new and useful Improvement in Mold-Clamping Devices, of which the following is a specification.

My invention relates to improvements in mold clamping devices.

It is particularly adapted for employment in connection with concrete molds in which tie-rods having adjustable collars thereon are employed to hold the clamping bars tightly against the side members of the mold.

The object of my invention is to provide means by which the clamping collars may be quickly adjusted to and held in their clamping positions on the rods preparatory to tightening the set screws which hold them in position on the tie-rods.

In the accompanying drawings which illustrate the preferred form of my invention—Figure 1 is an enlarged vertical sectional view showing a portion of one of the clamping bars, a part of one of the tie-rods, a clamping collar, and my improved tightening mechanism. Fig. 2 is a cross section on the line *a—b* of Fig. 1. Fig. 3 is a side elevation, showing a portion of the mold and the tightening mechanism mounted on one of the rods.

Similar characters of reference designate similar parts in the different views.

1 designates the side members of a mold. 2 the usual transverse clamping bars which hold the side members together, opposite bars being connected by horizontal tie-rods 3, on which are clamping collars 4, which bear against the outer sides of the bars 2, and which are held in their proper positions on the tie-rods 3, by means of set screws 5.

The mechanism for tightening the clamping collars 4 on the tie-rods 3 and against the clamping bars 2, comprises the following described parts:—A tubular member 6, which is adapted to be slidably mounted on any one of the tie-rods 3, has an externally screw threaded portion 7, fitted to the internally threaded portion 8 of another tubular member or nut 9, having in one end an annular recess 10, in which are mounted two ring bearing plates 11 and 12, the latter plate being rotative and adapted to bear against the outer end of any one of the clamping collars 4. The adjacent sides of the plates 11 and 12 are provided with coöperating annular grooves 14, which form ball races in which are mounted balls 15. The plates 11 and 12 and balls 15 form a thrust ball bearing of the ordinary type. The tubular member 6 is provided with a longitudinal slot 16 in which is pivoted, on a transverse pin 17, a lever 18, having a cam face 19, which is adapted to releasably, lockingly engage a tie-rod 3 when the member 6 is mounted thereon, as shown in the drawings.

In the operation of my invention, the side members 1, clamping bars 2, tie-rods 3, and clamping collars 4, are assembled in their operative positions, as shown in Fig. 3, the set screw in one clamping collar on each tie-rod being tightened while the set screw of the other collar is left untightened so as to permit the tie-rod being drawn through the clamping collar, as hereinafter described. The members 6 and 9 being in screw threaded connection with each other, are slipped on to one of the tie-rods 3 to a position in which the bearing plate 12 is against the clamping collar 4, in which the set screw has not been tightened, as shown in Fig. 1. The cam lever 18 is then swung to the left, as viewed in Fig. 1, thereby causing the cam face 19 to lockingly engage the adjacent tie-rod 3. The tubular member or nut 9 is then turned in a direction such that the bearing plate 12 will force the adjacent collar 4 and adjacent clamping bar 2 toward the opposite clamping bar and thereby clamping the side members 1 tightly together. The set screw 5 of the collar which has been adjusted is then tightened against the tie-rod adjacent thereto. The cam lever 18 may now be swung to the right, as viewed in Fig. 1, thereby releasing the members 6 and 9, which may be withdrawn from the tie-rod on which they are mounted and placed consecutively on the other tie-rods of the mold for effecting the function hereinbefore described. By reason of the threaded connection between the members 6 and 9, the tightening device is adapted for longitudinal expansion and contraction, for the purpose of pressing against and for being released from the adjacent collar 4.

I do not limit my invention to the structure described and shown, as modifications, within the scope of the appended claims, may be made without departing from the spirit of my invention.

Having thus described my invention, what I claim and desire to secure by Letters Patent, is:—

1. In a mold clamping device, a clamping collar, a tie-rod extending therethrough, releasable means for locking the collar to said rod, two tubular members mounted on said rod and having screw threaded connection with each other and rotatable one relative to the other, a thrust ball bearing carried by one of the tubular members and adapted to bear against and movable longitudinally on said rod with the member which carries it, independently of said collar, and means for releasably locking the other tubular member to said tie-rod.

2. In a mold clamping device, a clamping collar, a tie-rod extending therethrough, releasable means for locking the collar to said rod, two tubular members detachably mounted on said rod and having screw threaded connection with each other, one tubular member being rotatable relative to the other, a thrust ball bearing carried by the rotary member and adapted to bear against and movable longitudinally on said rod with the member which carries it independently of said collar, and a cam lever pivoted to the other tubular member for releasable locking said member to said rod.

3. In a mold clamping device, a tie-rod, two clamping collars mounted on said rod, each collar having means for being secured tightly to said rod, one of the collars being longitudinally adjustable on said rod, and a tightening device adapted for longitudinal expansion and contraction and for longitudinal adjustment on and having means for being releasably locked to said rod, and adapted to engage and longitudinally move and to be detached from said adjustable clamping collar.

4. In a mold clamping device, a tie-rod, a clamping collar longitudinally adjustable on said rod and having means for being releasably locked thereto, and a tightening device adapted for longitudinal expansion and contraction, and longitudinally adjustable on said rod independently of said clamping collar and adapted for longitudinally moving said collar, and provided with means for being releasably locked to said rod.

In testimony whereof I have signed my name to this specification in presence of two subscribing witnesses.

HENRY H. LAMPERT.

Witnesses:
E. B. House,
Warren D. House.